United States Patent
Matsumura et al.

(10) Patent No.: US 12,517,515 B2
(45) Date of Patent: Jan. 6, 2026

(54) ROBOT SYSTEM, CONTROL DEVICE OF ROBOT, AND CONTROL METHOD OF ROBOT

(71) Applicant: Hitachi, Ltd., Tokyo (JP)

(72) Inventors: Tadayuki Matsumura, Tokyo (JP); Kanako Esaki, Tokyo (JP); Hiroyuki Mizuno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 485 days.

(21) Appl. No.: 17/924,381

(22) PCT Filed: Nov. 12, 2021

(86) PCT No.: PCT/JP2021/041765
§ 371 (c)(1),
(2) Date: Nov. 10, 2022

(87) PCT Pub. No.: WO2023/084745
PCT Pub. Date: May 19, 2023

(65) Prior Publication Data
US 2024/0061431 A1 Feb. 22, 2024

(51) Int. Cl.
G05D 1/02 (2020.01)
G05D 1/00 (2006.01)
G06V 10/82 (2022.01)

(52) U.S. Cl.
CPC ......... *G05D 1/0214* (2013.01); *G05D 1/0221* (2013.01); *G05D 1/0246* (2013.01); *G06V 10/82* (2022.01)

(58) Field of Classification Search
CPC .. G05D 1/0214; G05D 1/0221; G05D 1/0246; G06V 10/82

(Continued)

(56) References Cited

U.S. PATENT DOCUMENTS 11,892,855 B2 * 2/2024 Lin ..................... G01C 22/00
2005/0197739 A1 9/2005 Noda et al.
(Continued)

FOREIGN PATENT DOCUMENTS

JP 2005-199402 A 7/2005
JP 2012130986 A * 7/2012

OTHER PUBLICATIONS

English Translation for JP2012130986A. (Year: 2025).*

(Continued)

*Primary Examiner* — Mahmoud S Ismail
(74) *Attorney, Agent, or Firm* — MATTINGLY & MALUR, PC

(57) ABSTRACT

A robot system includes a robot controlled by a computer. The robot includes a control device and an observation device. The computer detects a plurality of objects in a periphery by using observation information obtained by observation of the observation device, stores first state information of each of the plurality of detected objects, predicts future states of the plurality of detected objects from the first state information by using a first model for predicting a future state of an object, generates second state information of the periphery obtained by observation of the plurality of detected objects, predicts a future state of the robot from the second state information by using the first model, and determines a future action of the robot based on a given action target, the predicted future states of the plurality of objects, and the predicted future state of the robot.

11 Claims, 12 Drawing Sheets

(58) Field of Classification Search
USPC .......................................................... 701/301
See application file for complete search history.

(56) References Cited

U.S. PATENT DOCUMENTS

| | | | |
|---|---|---|---|
| 2022/0066454 A1* | 3/2022 | Takai | G05D 1/0214 |
| 2023/0038006 A1* | 2/2023 | Kim | G06V 10/82 |
| 2023/0166397 A1* | 6/2023 | Yang | G06N 3/049 |
| | | | 700/245 |
| 2023/0222614 A1* | 7/2023 | Konrardy | G08G 1/096725 |
| | | | 705/325 |

OTHER PUBLICATIONS

Venkatraman Narayanan et al., "ProxEmo: Gait-based Emotion Learning and Multi-view Proxemic Fusion for Socially-Aware Robot Navigation", IEEE/RSJ International Conference on Intelligent Robots and Systems (IROS), 2020, pp. 8200-8207.
S. M. Ali Eslami et al. "Neural scene representation and rendering", Science, vol. 360, No. 6394, Jun. 15, 2018, pp. 1204-1210.

\* cited by examiner

| 601 | 602 | 603 | 501 |
|---|---|---|---|
| OBJECT ID | POSITION AT TIME t-1 | POSITION AT TIME t | |
| 0 | (-2,5) | (0,0) | |

SELF-STATE INFORMATION

| 611 | 612 | 613 | 614 | 503 |
|---|---|---|---|---|
| OBJECT ID | POSITION AT TIME t-1 | POSITION AT TIME t | OBJECT TYPE | |
| 1 | (x1,y1) | (x1,y1) | VEHICLE (ROBOT) | |
| 2 | (x2,y2) | (x2,y2) | PERSON | |
| 3 | (x3,y3) | (x3,y3) | PERSON | |
| 4 | (x4,y4) | (x4,y4) | VEHICLE (ROBOT) | |

OTHER-STATE INFORMATION

ROBOT SYSTEM, CONTROL DEVICE OF ROBOT, AND CONTROL METHOD OF ROBOT

TECHNICAL FIELD

The present invention relates to a robot and a control thereof when a person and the robot operate under the same environment.

BACKGROUND ART

Autonomous robots that coexist with people in spaces where people live, such as self-driving vehicles, patrol robots and guidance robots in shopping malls and airports, and conversation robots that communicate with people have been developed. In the control of the robot that coexists with people, it is desirable not to generate an action optimized for an action target of the robot but to generate an appropriate action in consideration of an action expected by surrounding people or other robots. For example, in the movement control of an autonomous mobile robot, in a case where a route or a traveling speed having a margin in the distance from the autonomous mobile robot itself is expected in consideration of not only the minimization of the route length and the minimization of the required time but also the safety of surrounding people and other robots, the movement control in response to the expectation is desired.

As a method of determining the movement route of a robot in consideration of expectation of surrounding people for the robot, for example, a technique disclosed in NPL 1 is known. In NPL 1, a distance to be maintained between a pedestrian and a robot is computed in accordance with an estimated emotion of the pedestrian, and a movement route is generated in consideration of the computed distance.

Furthermore, as a method of generating an action in consideration of the priority of the action expected from the robot by a person as the communication partner in the control of a communication robot, for example, a technique disclosed in PTL 1 is known. In PTL 1, an action selection control system in a robot device includes a situation-dependent action hierarchy (SBL) that can select and output a specific action from a plurality of actions, and an AL computation unit that calculates an action value (AL) indicating an execution priority of each action for action selection. PTL 1 discloses the action control system in which the AL computation unit includes a self-AL computation unit and an other-AL computation unit that respectively calculate a self-AL and an other-AL indicating an execution priority of an action based on the own device and the other as an interaction target, and an AL integration unit that weights and adds the self-AL and the other-AL with a parameter for determining whether the state of the own device or the state of the other-device is emphasized, and outputs a final AL.

CITATION LIST

Patent Literature

PTL 1: JP 2005-199402 A

Non-Patent Literature

NPL 1: Narayanan, Venkatraman, et al. "ProxEmo: Gait-Based Emotion Learning and Multi-View Proxemic Fusion for Socially-Aware Robot Navigation." 2020 IEEE/RSJ International Conference on Intelligent Robots and Systems (IROS), 2020, pp. 8200-8207.

NPL 2: Eslami, S. M.Ali, et al. "Neural Scene Representation and Rendering." Science, vol. 360, no. 6394, 2018, pp. 1204-1210.

SUMMARY OF INVENTION

Technical Problem

Since the expectation of a person for a robot differs depending on a task executed by the robot, there is a problem of design cost that it is necessary to define the expectation of the person for the robot for each task of the robot. In addition, since it is necessary to define the expectation of a person for a robot for each task, there is a problem of versatility of robot application that it is difficult to divert a robot designed assuming a certain task to another task. In the method disclosed in PTL 1, the estimated state of the person is converted into the priority of the action expected for the robot by using a database designed in advance. Therefore, it is necessary to define the relationship between the state of the person and the action expected for the robot, and there are a problem of the cost of designing an expected action for each emotion of the person, and a problem that it is difficult to apply the robot to other tasks. In the method disclosed in NPL 1, an estimated emotion of the person is converted into the distance to be secured between the person and the robot by using a computation expression designed in advance. Thus, there are problems that it is not possible to express the expectation of the person for the robot by an expression other than the distance between the person and the robot, and it is difficult to apply the robot to other tasks.

An object of the present invention is to realize an action of a robot capable of being generally applied to various uses regardless of a task given to the robot, in consideration of expectations of surrounding people and robots.

Solution to Problem

A representative example of the invention disclosed in the present application is as follows. That is, a robot system includes a robot that is controlled by a computer. The robot includes a control device that is connected to the computer and controls an action of the robot, and an observation device that is connected to the computer and observes a periphery of the robot. The computer includes an arithmetic operation device that executes a program, a storage device that is connected to the arithmetic operation device, and an interface that is connected to the arithmetic operation device. The computer detects a plurality of objects in a periphery by using observation information obtained by observation of the observation device, stores first state information of each of the plurality of detected objects, predicts future states of the plurality of detected objects from the first state information by using a first model for predicting a future state of an object, generates second state information of the periphery observed by the plurality of detected objects, predicts a future state of the robot from the second state information by using the first model, determines a future action of the robot based on a given action target, the predicted future states of the plurality of objects, and the predicted future state of the robot, and controls the action.

Advantageous Effects of Invention

According to an aspect of the present invention, it is possible to realize an action of a robot capable of being generally applied to various uses regardless of a task given to the robot, in consideration of expectations of surrounding people and robots. Objects, configurations, and effects other than those described above will be clarified by the descriptions of the following embodiments.

DESCRIPTION OF EMBODIMENTS

Figure 1:
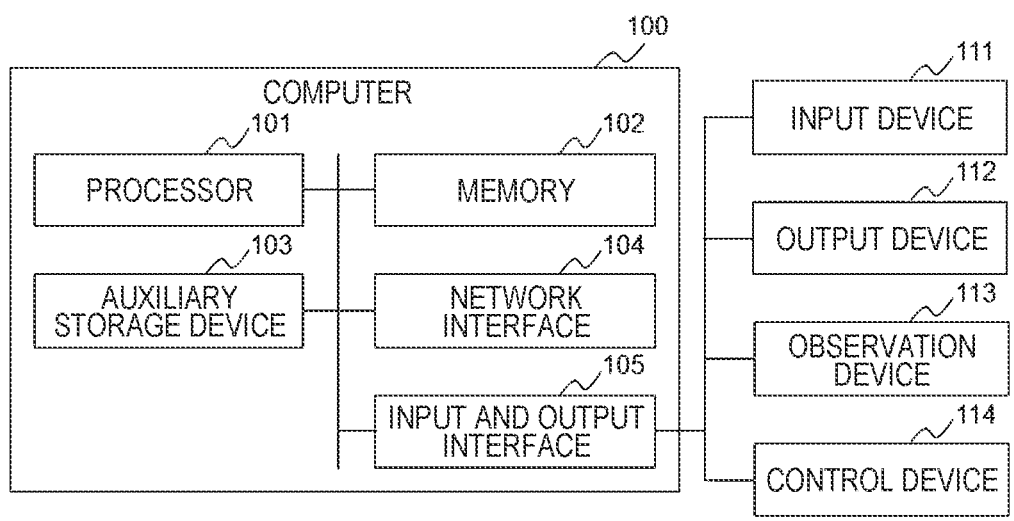
FIG. 1 is a diagram illustrating an example of a hardware configuration of an autonomous robot according to a first embodiment.

Hereinafter, embodiments of the present invention will be described with reference to the drawings. The present invention is not construed as being limited to the embodiments as follows. Those skilled in the related art can easily understand that the specific configuration may be changed in a range without departing from the technical idea or the gist of the present invention.

In the configuration of the invention described below, the same or similar components or functions are denoted by the same reference signs, and repetitive descriptions will be omitted. In this specification and the like, the notations "first", "second", "third", and the like are used for identifying the constituent elements, and the number or order is not necessarily limited. Positions, sizes, shapes, ranges, and the like of the components illustrated in the drawings and the like may not represent actual positions, sizes, shapes, ranges, and the like in order to facilitate understanding of the invention. Therefore, the present invention is not limited to the position, size, shape, range, and the like disclosed in the drawings and the like.

First Embodiment

FIG. 1 is a diagram illustrating an example of a hardware configuration of an autonomous robot according to a first embodiment.

The autonomous robot includes a computer 100, an input device 111, an output device 112, an observation device 113, and a control device 114. As illustrated in FIG. 1, the computer 100 may be mounted in the autonomous robot, or may be mounted separately from the autonomous robot.

The computer 100 includes a processor 101, a memory 102, an auxiliary storage device 103, a network interface 104, and an input and output interface 105. The hardware elements are connected to each other via a bus.

The processor 101 is an arithmetic operation device that controls the entirety of the computer 100, and executes a program stored in the memory 102. The processor 101 executes processes in accordance with the program, and thereby operates as a functional unit (module) that realizes a specific function. In the following descriptions, in a case where descriptions are made by using the functional unit as a subject, it is indicated that the processor 101 executes the program of realizing the functional unit.

The memory 102 is a storage device that stores the program executed by the processor 101 and information used at the time of executing the program. The memory 102 is also used as a work area.

The auxiliary storage device 103 is a storage device that permanently stores data, and is, for example, a hard disk drive (HDD), a solid state drive (SSD), or the like. The program and the information stored in the memory 102 may be stored in the auxiliary storage device 103. In this case, the processor 101 reads the program and the information from the auxiliary storage device 103 and loads the program and the information into the memory 102.

The network interface 104 is an interface for connection with an external device via a network.

The input and output interface 105 is an interface for connection with the input device 111, the output device 112, the observation device 113, and the control device 114.

The input device 111 is a keyboard, a mouse, a touch panel, or the like, and a user inputs an instruction to the computer 100. The output device 112 is a display or the like, and outputs an arithmetic operation result by the computer 100 so that the user can recognize the arithmetic operation result. In a case where the autonomous robot is a communication robot, the output device 112 may include a speaker that outputs sound. The observation device 113 is an image pickup device that acquires an image and video data, a device that observes a surrounding environment of the autonomous robot, such as a depth camera, a millimeter wave radar, and Light Detection and Ranging (LiDAR), and a device that detects the state of the robot, such as a position, a steering state, and an accelerator state. In a case where the autonomous robot is a communication robot, the observation device 113 may include a microphone or the like that acquires sound. The control device 114 is a device that controls a steering angle, an accelerator, and the like of the robot.

Figure 2:
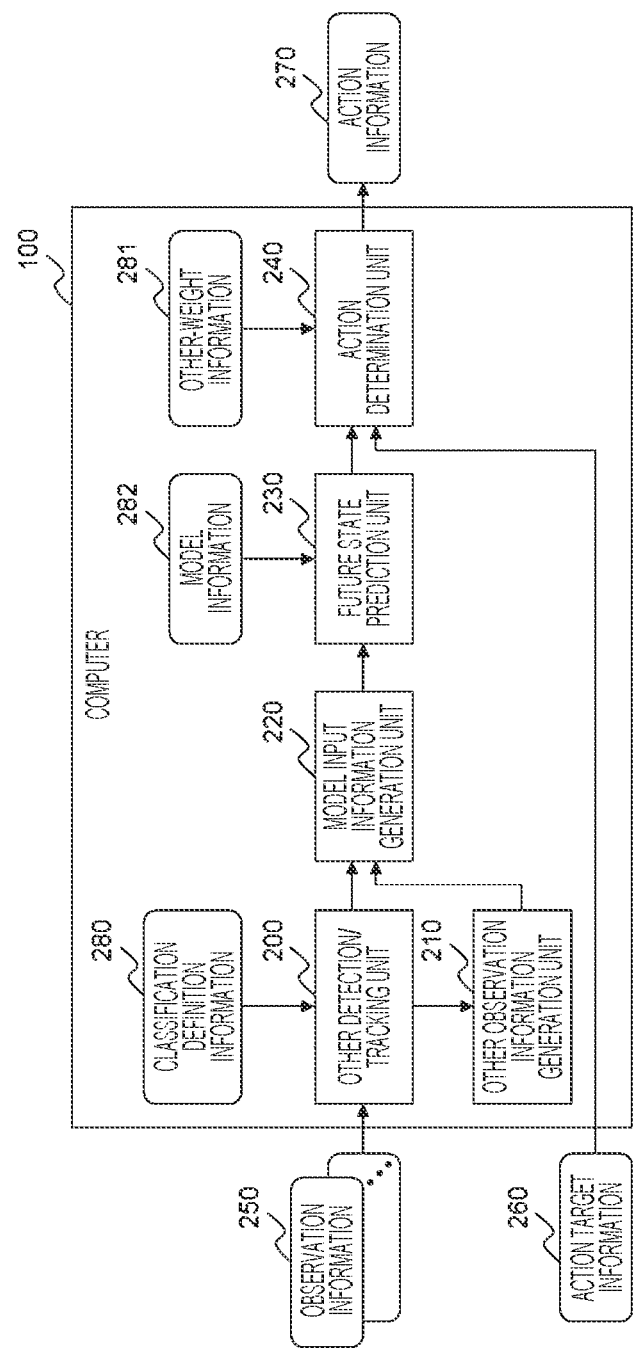
FIG. 2 is a diagram illustrating an example of a functional configuration of a computer in the first embodiment.

FIG. 2 is a diagram illustrating an example of a functional configuration of the computer 100 in the first embodiment.

The autonomous robot includes an other detection/tracking unit 200, an other observation information generation unit 210, a model input information generation unit 220, a future state prediction unit 230, and an action determination unit 240. The autonomous robot receives an input of observation information 250 and action target information 260 from the outside, and outputs action information 270. In addition, the autonomous robot stores classification definition information 280, other weight information 281, and model information 282.

The observation information 250 is a result obtained by observing the state of the robot and the periphery of the robot, and includes, for example, position information of the robot by a GNSS, remaining amount information of a battery of the robot, an observation image obtained by picking up an image of the periphery of the robot, point cloud information acquired by a LiDAR and the like.

The other detection/tracking unit 200 detects and tracks a surrounding object such as a person or another robot in the observation image included in the observation information. In the present specification, when a specific person or robot is defined as himself/herself, a person or robot around the person or robot is referred to as another person. The other detection/tracking unit 200 can include only a detection function in a case where tracking of the other person is unnecessary. The classification definition information 280 is information referred to for classifying the detected other people. For example, the classification definition information 280 is definition information of an object classifier, and represents classification information such as whether the detected other person is a person or a robot.

The other observation information generation unit 210 may generate the observation information of the detected other person by inference, or may acquire the observation information of the other person by external communication in a case where the other person is a communicable partner such as a robot. Furthermore, the other observation information generation unit 210 may construct a three-dimensional map from two-dimensional or three-dimensional images picked up from a plurality of points, and generate other observation information from the constructed three-dimensional map.

The model input information generation unit 220 converts the generated or acquired observation information into a format that can be input into the model of the future state prediction unit 230.

The future state prediction unit 230 predicts future information of the input observation information. Model information 282 is configuration information of the model of the future state prediction unit 230. For example, the model information 282 includes configuration information of a neural network, learned parameter information, and the like.

The action determination unit 240 determines the action information 270 in accordance with the action target information 260 input from the outside, the prediction information of the observation information of the own robot generated by the future state prediction unit 230, and the prediction information of the observation information of the other person. The other weight information 281 is information including the type and the feature of an object, and is referred to for performing a weighting operation for each type of the other person. The action information 270 is a control signal of a steering angle or an accelerator of the robot.

In the present embodiment, a method of determining an action by using a learned model will be described, and a model learning method will not be described. The learning of the model is performed by using a method generally applied to the learning of the model with the history of the observation and the action as input and output information. For example, in a case where the model is a neural network, learning can be performed by using an error back propagation method or the like. A configuration in which history information of the observation and the action of the autonomous robot is acquired and stored during an operation (online), and the model is re-learned at an appropriate timing during the operation may be made. In this case, the autonomous robot is configured to include a storage for storing input and output information serving as learning data and a function for performing learning.

Figure 3:
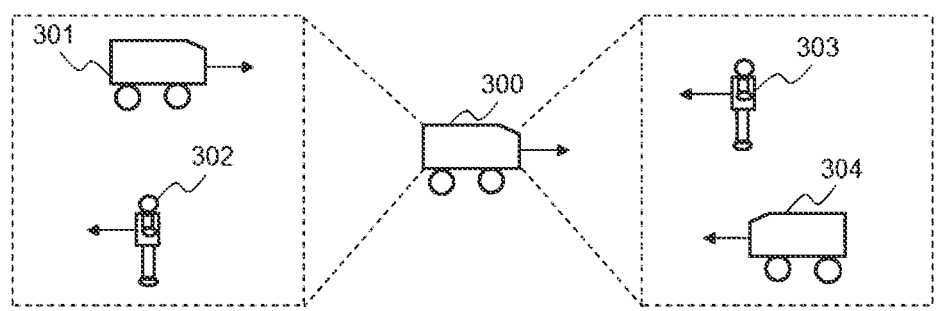
FIG. 3 is a diagram illustrating an example of an operation state of the autonomous robot in the first embodiment.

FIG. 3 is a diagram illustrating an example of an operation state of the autonomous robot in the first embodiment. In FIG. 3, there is an autonomous robot 300 being a control target. Another robot 301 that moves in the same direction as the autonomous robot 300 and a person 302 that moves in the opposite direction to the autonomous robot 300 exist behind the autonomous robot 300. In addition, a person 303 and another robot 304 that move in a direction facing the autonomous robot 300 exist in front of the autonomous robot 300. The autonomous robot moves towards a given destination set forward.

Figure 4A:
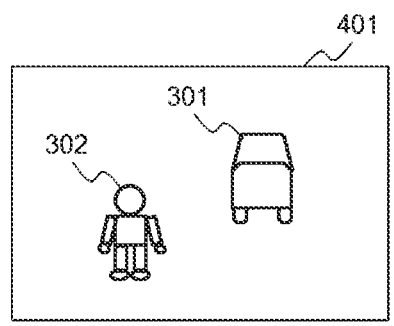
FIG. 4A is a view illustrating an example of a rear observation image acquired by the autonomous robot in a situation of FIG. 3.
Figure 4B:
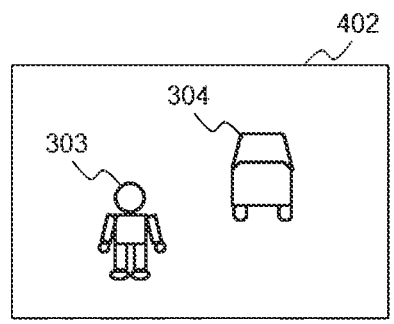
FIG. 4B is a view illustrating an example of a front observation image acquired by the autonomous robot in the situation of FIG. 3.
Figure 4C:
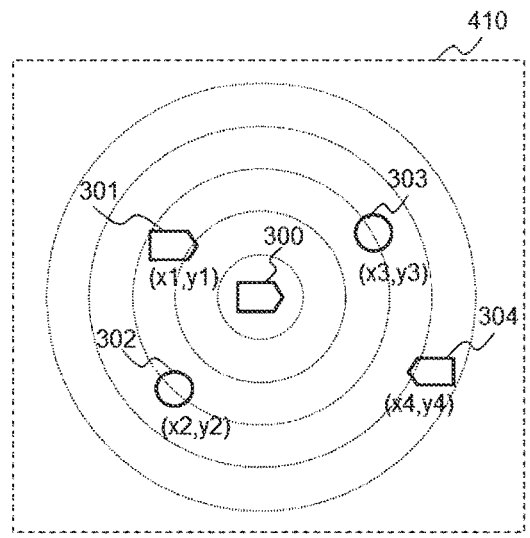
FIG. 4C is a diagram illustrating an example of position information of an object around the autonomous robot in the situation of FIG. 3.

In the first embodiment, the autonomous robot 300 normally acquires images of the front and the rear by the observation device 113. In addition, the autonomous robot 300 normally measures distances to objects in the front and the rear by a LiDAR, a depth sensor, or a millimeter wave sensor. FIG. 4A is a view illustrating an example of image information 401 that is obtained by observing the rear side and is acquired by the autonomous robot 300 in the situation of FIG. 3. FIG. 4B is a view illustrating an example of image information 402 that is obtained by observing the front side and is acquired by the autonomous robot 300 in the situation of FIG. 3. FIG. 4C is a view illustrating an example of position information 410 of an object around the autonomous robot 300 in the situation of FIG. 3.

The acquisition information acquired by the LiDAR of the observation device 113 is point cloud data. The acquisition information acquired by a depth camera is a two-dimensional image to which depth information is added. The acquisition information directly acquired by such observation devices 113 is not information of each object in the format indicated by the position information 410 of the surrounding object. The position information 410 of the surrounding object is generated by integrating pieces of observation information such as a LiDAR, a depth camera, and an observation image. In the present specification, for easy description, description will be made on the assumption that an integration process of the observation information is included in the observation device 113, and the observation device 113 acquires the position information 410 of the surrounding object. An example in which the position of the surrounding person or robot is displayed in two-dimensional coordinates (X-coordinate, Y-coordinate) with the autonomous robot 300 as the origin in the position information 410 of the surrounding object is shown. In the first embodiment, the position of each object is represented as two-dimensional information, but may be represented as a position in a three-dimensional space including a height direction.

Figure 5:
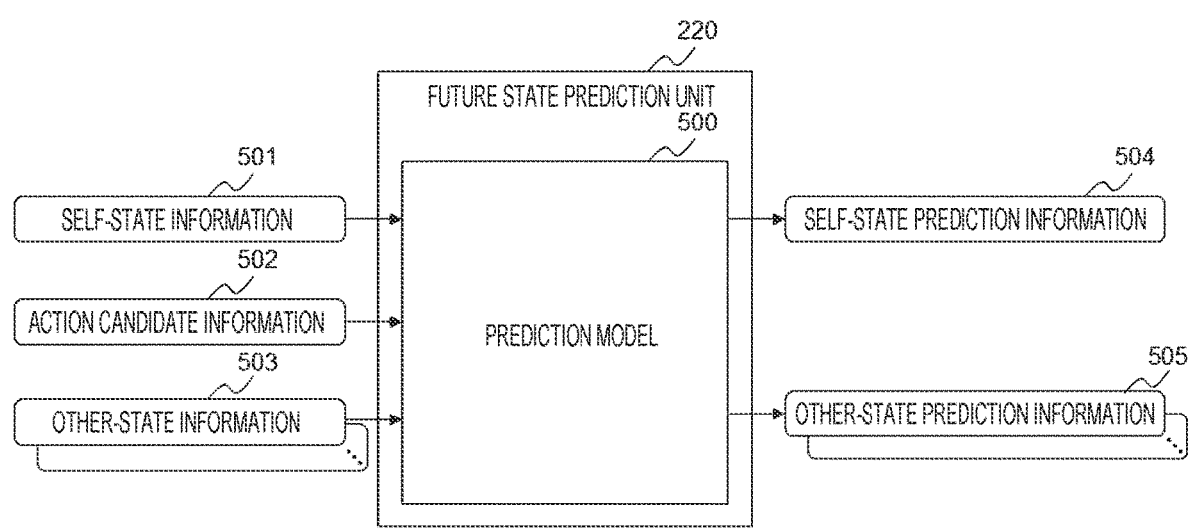
FIG. 5 is a diagram illustrating a configuration example of a future state prediction unit.

FIG. 5 is a diagram illustrating a configuration example of the future state prediction unit 230. The future state prediction unit 230 includes a prediction model 500.

The prediction model 500 receives, as input, self-state information 501 indicating the current state of the robot, action candidate information 502 indicating an action assumed by the robot, and other-state information 503 indicating the current states of a plurality of others, and outputs self-state prediction information 504 which is prediction information of the future state of the robot, and other-state prediction information 505 which is prediction information of the future state of the other person. In the prediction model 500, for example, the neural network can be configured by, for example, a graph neural network or the like capable of handling graph representation in which a plurality of objects are set as vertices (nodes) and a relationship between the objects is set as an edge. In addition, probability models such as a neural network that handles a point cloud, a normal multilayer neural network, and a time-series model that is not a neural network can also be used. The prediction model 500 can be configured not by a model that predicts one prediction value but by a Bayesian model that predicts as a probability distribution. For example, in a case where a future position is predicted as a probability distribution, prediction information is output as a probability that a target robot or person exists at each surrounding position in the future.

The prediction model 500 performs learning by using the action of the robot and the history information of the observation of the states of the robot and the others at that time. The learning may be performed before the operation of the computer 100, or the model may be updated by performing learning online at an appropriate time from the observation information obtained during the operation.

In the first embodiment, the robot and the others input to the future state prediction unit 230 are applied to two different cases.

In the first case, as illustrated in FIG. 4C, the autonomous robot 300 is set as the own robot, and persons 302 and 303 and robots 301 and 304 around the autonomous robot 300 are set as others.

Figures 6A, 6B, 7:
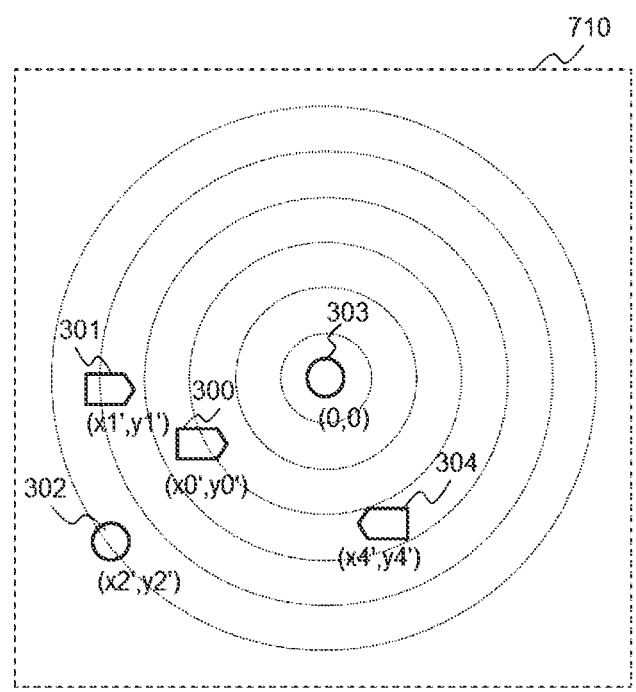
FIG. 6A is a diagram illustrating an example of self-state information of the autonomous robot in the example illustrated in FIG. 3.
FIG. 6B is a diagram illustrating an example of state information of another person in the example illustrated in FIG. 3.
FIG. 7 is a diagram illustrating a second case of a person or the robot and another person or another robot given to the future state prediction unit.

FIG. 6A is a diagram illustrating an example of the self-state information 501 of the autonomous robot in the example illustrated in FIG. 3. FIG. 6B is a diagram illustrating an example of the other-state information 503 in the example illustrated in FIG. 3.

The self-state information 501 includes an object ID 601, a position 602 at a time t−1, and a position 603 at a time t in a case where the current time is set as t. In the present embodiment, an example using pieces of information corresponding to two times being the time t−1 and the time t are used, but pieces of information corresponding to three times or more may be used. Furthermore, in the present embodiment, a case using the position as the self-state will be described, but information such as a speed, an acceleration, a steering angle, and an azimuth angle may be used as the self-state. The position may be expressed by a relative value from the current position.

The other-state information 503 includes an object ID 611, a position 612 at the time t−1, a position 613 at the time t, and a type of an object 614. In the first embodiment, since the position of the object is computed at a plurality of times, the other detection/tracking unit 200 has an object detection and tracking function. The position is expressed by a relative value from the position of the autonomous robot at the current time t. The type of the object is, for example, information indicating whether the object is a person or a car. Similar to the self-state information 501, pieces of position information for three times or more may be used. Further, similar to the self-state information 501, the speed or the acceleration may be set as the self-state.

The self-state information 501 and the other-state information 503 are generated by the model input information generation unit 220 from the observation information 250 and processing information of the other detection/tracking unit 200. In a case where a graph neural network is used as the prediction model 500, a relationship between objects may be given as branch (edge) information. For example, the edge information can be assigned in accordance with the type of the object or the distance between the objects.

In the present embodiment, a case where all the others in the observation information are targeted will be described. An object as a prediction target may be determined in advance, and an object other than the target may be excluded from the prediction target. For example, the object set not to be the target is designated in accordance with the type of object defined by the classification definition information 280. The object as the prediction target may be selected in accordance with the distance to the autonomous robot as a control target. For example, an object having a distance from the autonomous robot within a predetermined value may be set as the prediction target, and other objects may be excluded from the prediction target. The model input information generation unit 220 may select the prediction target. By limiting the prediction target by the determination result using the classification definition information, it is expected to obtain an effect of improving the learning performance of the prediction model by reducing the computation cost in a case where a large number of others exist in the surroundings, and reducing the number of parameters of the prediction model 500.

The action candidate information 502 is, for example, a control signal such as a steering angle and an acceleration amount of the autonomous robot.

For example, in a case where it is assumed that the own robot performs steering to the right by 30° and drives at the output being 10% of the accelerator, the prediction model 500 predicts the current states of the current own robot and the other, and the future states of the current own robot and the other.

In the second case, one of surrounding people or robots that are set as the others in the first case is defined as the own robot, and people or robots around the own person or robot are set as the others. In the second case, the autonomous robot 300 being the control target is handled as one of the surrounding people and others of the robot. FIG. 7 is a diagram illustrating the second case of the own robot and the other which is given to the future state prediction unit 230.

In contrast to the example in which the autonomous robot 300 is set as the own robot (the position information 410 illustrated in FIG. 4C), FIG. 7 illustrates an example in which a person 303 around the autonomous robot 300 is set as the own person. The following description is similarly conceivable in a case where the surrounding person 302 and the surrounding robots 301 and 304 are set as the own person or robot.

In the second case, the model input information generation unit 220 converts the observation information of the own person or robot and the other into the observation information in which the person 303 is set to the own person. For example, in a case where the observation information is the position information 410 (FIG. 4C) of the surrounding others, the position information 710 of the surrounding others in a case where the person 303 is set to the own person is generated by moving the center coordinates from the autonomous robot 300 to the person 303. Assuming that the own person is the person 303, the model input information generation unit 220 generates the self-state information 510 and the other-state information 503 to be input to the prediction model 500, similarly to the first case, in accordance with the converted observation information.

In order to predict the future state by using the prediction model 500, it is necessary to input the action candidate information 502 of the own person or robot. However, in a case where an object other than the autonomous robot 300 being the control target is the own robot, an appropriate action selected by another person is unknown. In the first embodiment, it is assumed that a person does not take an action as the action candidate information 502 of another person. As an example of the case of not taking an action, for example, a case where the steering angle is not changed and the control of the accelerator is not changed may be conceivable. Furthermore, as another method, an average of a plurality of randomly generated action predictions may be adopted, or in a case where all action predictions can be known, an average of all action predictions may be adopted.

With the information generated as described above, it is possible to output the prediction information in a case where a person or a robot around the autonomous robot 300 is set as the own robot.

Figure 8A:
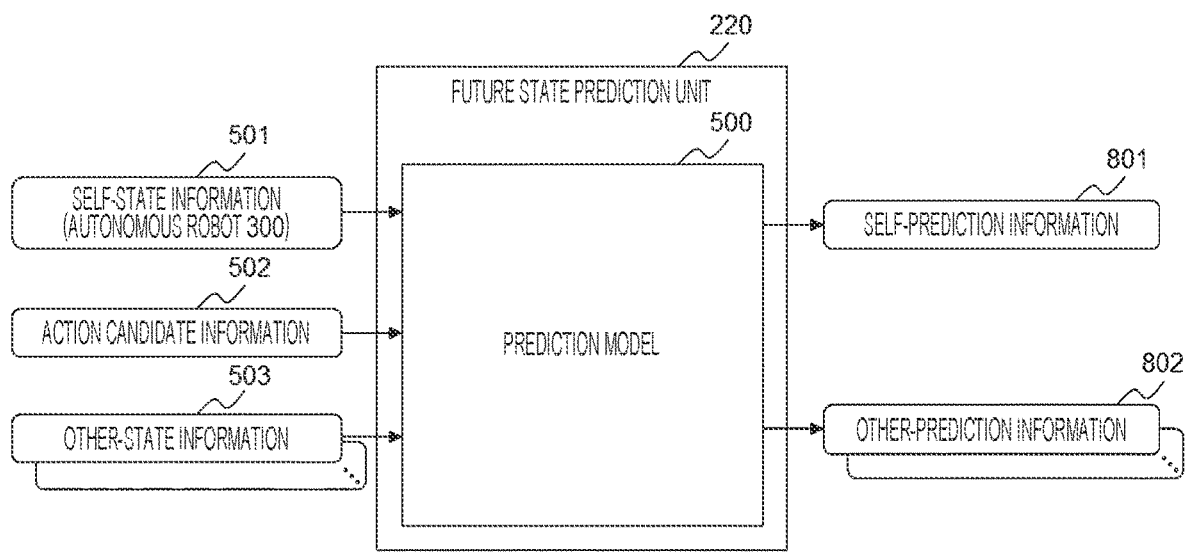
FIG. 8A is a diagram illustrating prediction information generated in a first case.
Figure 8B:
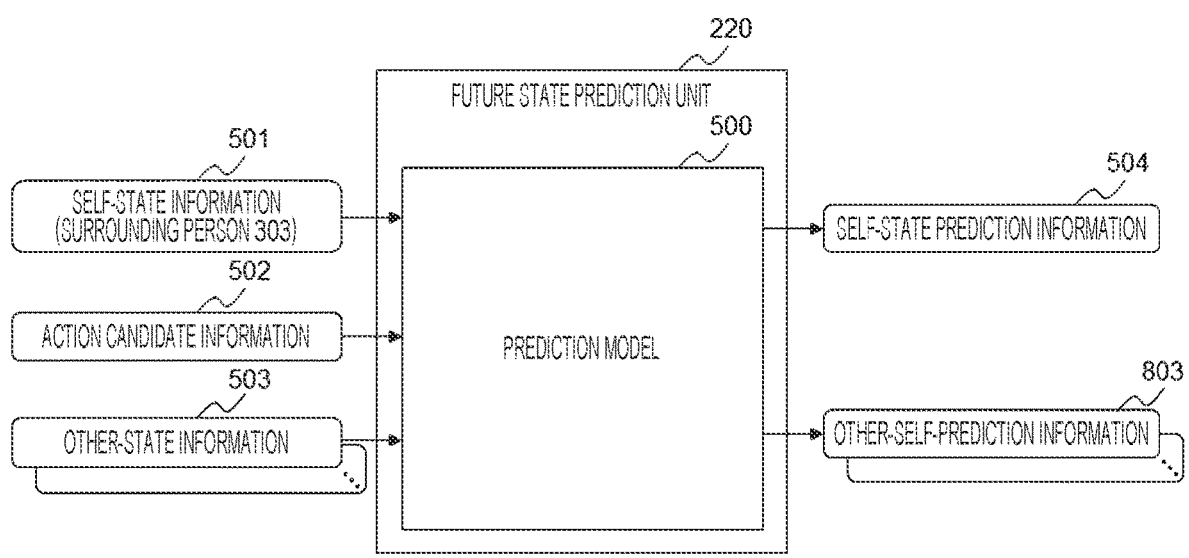
FIG. 8B is a diagram illustrating prediction information generated in a second case.

As described above, it is possible to generate different types of prediction information by applying the prediction model 500 to two cases. FIGS. 8A and 8B are diagrams illustrating prediction information generated in the first case and the second case, respectively.

The self-prediction information 801 that is prediction information of the future state of the autonomous robot 300 in a case where the autonomous robot 300 is set as the own robot is generated by the prediction in the first case. Furthermore, by the prediction in the first case, the other-prediction information 802 that is the future state predicted by the autonomous robot 300 for the surrounding others in a case where the autonomous robot 300 is set as the own robot is generated. Then, by the prediction in the second case, in a case where one of the person and the robot around the autonomous robot 300 is set as the own robot or person, the other-self-prediction information 803 that is the future state predicted for the autonomous robot 300 by the other is generated. The other-self-prediction information 803 is generated for each of a person and a robot around the autonomous robot 300. For example, in the situation of FIG. 3, the other-self-prediction information 803 is generated for the surrounding persons 302 and 303 and the surrounding robots 301 and 304.

In the first embodiment, in the autonomous robot that coexists with a person, the expectation of the person for the autonomous robot is considered as the future state of the autonomous robot predicted by the person. Thus, it is possible to make the general-purpose expression that does not depend on the application task of the autonomous robot, and to suppress the increase in the design cost defining the expectation of the person and the action of the autonomous robot for each application task of the autonomous robot.

In the first embodiment, the autonomous robot 300 uses the prediction model 500 for predicting the others around the autonomous robot 300 also for predicting the future state of the autonomous robot 300 by a specific other around the autonomous robot. That is, regarding the prediction model 500, the same prediction model 500 is used to perform prediction in both the case where the own robot or person is the autonomous robot 300 and the case where the own robot or person is a person and a robot around the autonomous robot 300. This is based on the idea of a mirror system (may be also referred to as a simulation hypothesis) which is a hypothesis of a mechanism of other inference. It is assumed that the mirror system realizes the other inference by simulating emotions and cognition of the other person by using the own body. In the first embodiment, in order to generate the prediction of the other person around the autonomous robot 300, the prediction of the other person is simulated by the own model by using the same prediction model 500 as that in the case where the autonomous robot 300 is the own robot and by inputting observation information of the other person to the prediction model 500.

Figure 9:
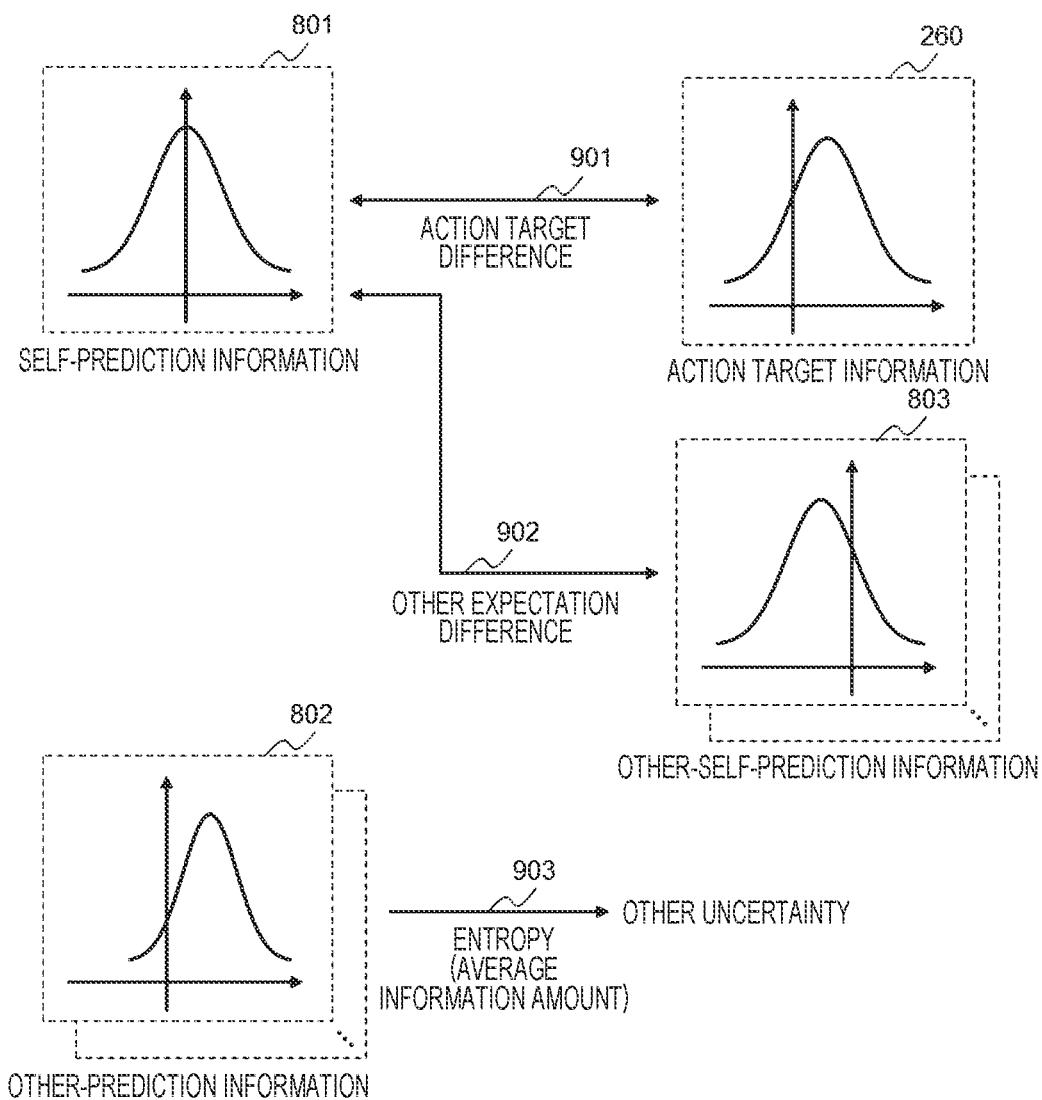
FIG. 9 is a diagram illustrating a method in which an action determination unit selects an action from self-prediction information, other-prediction information, other-self-prediction information, and action target information input from an outside.

The action determination unit 240 selects an action in accordance with the self-prediction information 801, the other-prediction information 802, and the other-self-prediction information 803 generated by the future state prediction unit 230, and the action target information 260 input from the outside. FIG. 9 is a diagram illustrating a method in which the action determination unit 240 selects an action from the self-prediction information 801, the other-prediction information 802, the other-self-prediction information 803, and the action target information 260 input from the outside. In the first embodiment, a case where the self-prediction information 801, the other-prediction information 802, and the other-self-prediction information 803 are generated as a probability distribution, and the action target information 260 is also given as the probability distribution will be described. As a method of giving the action target information 260 as the probability distribution, for example, a method of providing a normal distribution with a target point as a peak from coordinate information determined by GNSS information of the destination in a case where movement to a given destination is an action target is considered as an example. FIG. 9 illustrates the positions that are the states of the own robot or person and the others, as one-dimensional positions for ease of illustration. However, in a case where the position information is two-dimensional as in the case of FIG. 3, the position information may be considered as a probability distribution indicating the position in the two-dimensional space.

The action determination unit 240 receives the self-prediction information 801, the other-prediction information 802, and the other-self-prediction information 803 generated by the future state prediction unit 230. The action determination unit 240 computes, for each action candidate, an action target difference 901 representing a difference (distance) between the self-prediction information 801 and the action target information 260 in a case where the action is taken. The action target difference 901 is an amount representing how close the future state of the own robot or person is to the state of the action target when a certain action is taken. Furthermore, the action determination unit 240 computes an other expectation difference 902 representing a difference (distance) between the self-prediction information 801 and the other-self-prediction information 803. The other expectation difference 902 is an amount representing how close the future state of the own robot or person is to the state predicted for the own robot or person by the others when a certain action is taken. In a case where there are a plurality of others, the other expectation difference 902 is computed for each of the others.

Furthermore, the action determination unit 240 computes entropy (average information amount) of the other-prediction information 802 as the other uncertainty 903. The other uncertainty 903 represents the uncertainty of the prediction of the others. In a case where there are a plurality of others, the other uncertainty 903 is computed for each other.

The action determination unit 240 selects, as an optimal action, an action that minimizes the weighted sum of the action target difference 901, the other expectation difference 902, and the other uncertainty 903 among the action candidates. That is, when the action target difference 901 is set as A, the other-self-prediction information for each other is set as Bi, and the other uncertainty for each other is set as Ci, an action that minimizes an index F represented by the following Expression (1) is selected as the optimal action.

$$F=A+\text{SUM}(bi \times Bi)+\text{SUM}(ci \times Ci) \quad (1)$$

In Expression (1), SUM is an operation of computing the sum for each the other (i). In addition, bi and ci represent the weights of the other-self-prediction information Bi and the other uncertainty Ci for each other, and are given by other weight information 281. The weight of the other may be determined in advance in accordance with the type of the other, and the detected other may be labeled with reference to at least one of the type and the feature of the object of the classification definition information 280 to determine the value of the weight of each of the others. For example, in a case where a person is prioritized over a robot, the weight information may be determined to increase the weight of the person depending on whether the type of the other person is a person or a robot. In addition, ci may be reduced to reduce the influence of the other uncertainty. For example, since the uncertainty of the other at the far position contributes little to the own action, the weight of the other at the far position may be reduced. By determining the own action in consideration of the prediction from the other in a weighted manner, it becomes easier to avoid a collision with the other, such as giving priority to collision avoidance with the other at a close position. In addition, ci may be set to a negative value. In a case where ci is set to be negative, it is expected that an action of collecting observation data with a small amount of learning data can be taken by selecting an action with higher other uncertainty. In addition, the weight of the others may be set to the same value for each other. Further, the third term SUM(ci*Ci) may not be used.

In a case where the self-prediction information 801, the other-self-prediction information 803, and the action target information 260 are given as probability distributions, a method of computing the action target difference 901 by using a difference between the probability distributions as Kullback-Leibler divergence is provided an example. Even in a case where the prediction information and the action target information 260 are given as one prediction value instead of the probability distribution, the action determination unit 240 selects the optimal action by a similar method by defining a method of computing a difference between the prediction value and the target value, and between the prediction values.

In addition, the optimal action for minimizing the index F may be selected by using the following Expression (2) instead of the above-described Expression (1).

$$F=A+\text{SUM}(vi \times Bi \times Ci)+\text{SUM}(bi \times Bi) \quad (2)$$

Since Bi includes information of a prediction error indicating the uncertainty of the other prediction, in Expression (2), by multiplying Ci by Bi, the expectation from the other having high uncertainty is less meaningful to prediction, and thus the ratio is reduced. vi represents the weight of the other uncertainty Ci.

Figure 10:
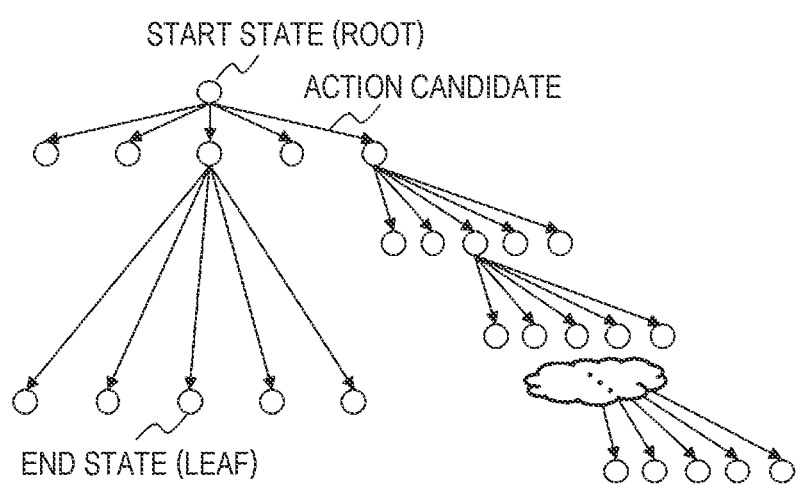
FIG. 10 is a diagram illustrating a case where an action is determined based on prediction information at a plurality of times.

A case where the action determination unit 240 determines an action based on prediction information after one time by using the future state prediction unit 230 has been described with reference to FIG. 9. The action determination unit 240 may determine an action based on prediction information before a plurality of times, by repetitive computation of the future state prediction unit 230 a plurality of times. FIG. 10 is a diagram illustrating a case where an action is determined based on prediction information at a plurality of times. In a case where an action is determined based on prediction information at a plurality of times, in a state at each future time, a tree branching with an action to be selected is considered, a value of the action is obtained for a series of action sequences up to a leaf, and an optimal action is searched for. For example, FIG. 10 illustrates an example of a case where the tree search is performed assuming that there are five action candidate options in each state from the start state (root). In the tree search, the end state (leaf) is a state in a case where the depth at the time of the predetermined search has been reached or a state determined by a task of the robot. The case defined by the task of the robot is, for example, at the time of collision with another person, at the time of reaching the target point, or the like in a movement task. For a series of actions, an evaluation for the series of actions, such as a value computed by Expression (1) in each leaf and a sum or an average value of values computed by Expression (1) in a series of nodes from root to leaf, can be variously defined based on Expression (1). In addition, as in the case of the movement task, in a case where the value can be defined by a logical value (success or failure) such as a state to be avoided or a state to be reached when the leaf collides with the other or reaches the target point, an optimal action may be selected in consideration of not only the value of Expression (1) but also the logical value of the leaf. The consideration of the logical value of the state can be similarly applied not only to the case of predicting the future of a plurality of times but also to the case of predicting the time after one time. In a case where the number of action selection candidates is large, a probabilistic tree search such as a Monte Carlo tree search may be applied.

Second Embodiment

A second embodiment is different from the first embodiment in terms of weighting information of the other. The second embodiment will be described focusing on the difference from the first embodiment, and the description of the same configuration as the first embodiment will be omitted.

A hardware configuration of an autonomous robot in the second embodiment is the same as that in the first embodiment.

Figure 11:
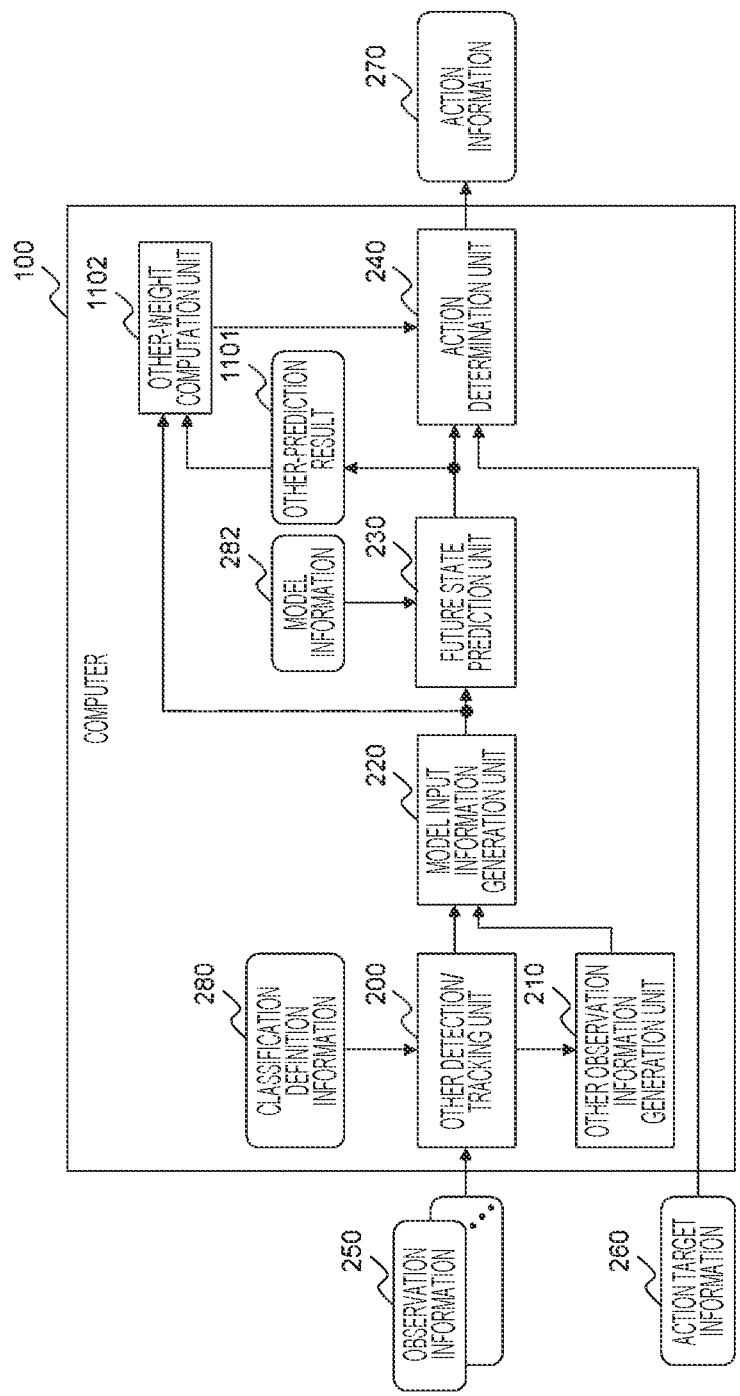
FIG. 11 is a diagram illustrating an example of a functional configuration of a computer in a second embodiment.

FIG. 11 is a diagram illustrating an example of a functional configuration of a computer 100 in the second embodiment.

The functional configuration in the second embodiment is different from the functional configuration in the first embodiment in that an other-prediction result 1101 storing other-prediction information 802 generated by the future state prediction unit 230 and an other-weight computation unit 1102 are included.

In the second embodiment, the other-weight computation unit 1102 generates a weight for the other in the autonomous robot from a result of a process by the other detection/tracking unit 200 using the other-prediction result 1101, the observation information 250 obtained by new observation at the next time, and the observation information 250 at the next time.

The other-weight computation unit 1102 compares the other-prediction result 1101 with the observation value of the other in the observation information 250 at the next time, computes a prediction error, and computes the weight of the other in accordance with the computed prediction error. As a method of weighting the other in accordance with the prediction error, for example, there are a method of increasing the weight as the prediction error is smaller and a method of decreasing the weight as the prediction error is larger. In addition, regarding the weight value, the weight value may be determined in accordance with the correspondence between the determined rank and the weight by ranking a value obtained by normalizing the prediction error, or ranking the others in accordance with the prediction error.

The other-weight computation unit 1102 may determine the weight value in accordance with not only the prediction error but also the position information of the other obtained from the other detection/tracking unit 200. For example, the weight value may be determined in accordance with the distance between the autonomous robot 300 and the other. The weighting method and the computation method of the weight value can be considered similarly to the prediction error computation method.

Furthermore, the other-weight computation unit 1102 may determine the weight value in consideration of both the prediction error and the position information of the other obtained from the other detection/tracking unit 200.

In the second embodiment, the accuracy of action prediction is improved, and it becomes easy to avoid the collision between the autonomous robot and the other.

Third Embodiment

A third embodiment is different in that the other around an autonomous robot 300 predicts the future state of the autonomous robot 300, that is, relates to generation of the other-self-prediction information 803. The third embodiment will be described focusing on the difference from the first embodiment, and the description of the same configuration as the first embodiment will be omitted.

A hardware configuration in the third embodiment is the same as that in the first embodiment.

Figure 12:
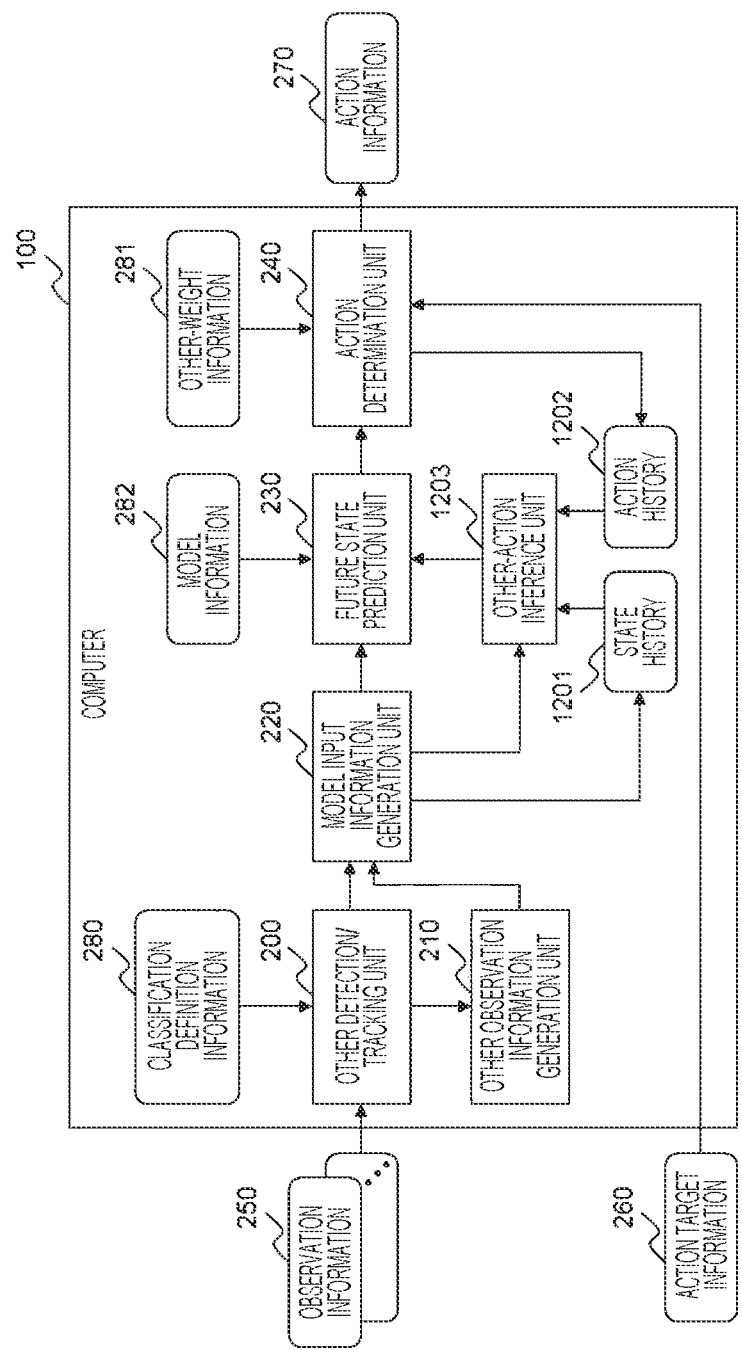
FIG. 12 is a diagram illustrating an example of a functional configuration of a computer in a third embodiment.

FIG. 12 is a diagram illustrating an example of a functional configuration of a computer 100 in the third embodiment.

The third embodiment is different from the first embodiment in that a state history 1201 storing a history of the observation information, an action history 1202 storing a history of actions executed by the autonomous robot 300 at the time of the information stored in the state history 1201, and an other-action inference unit 1203 that infers other actions are provided.

Figure 13:
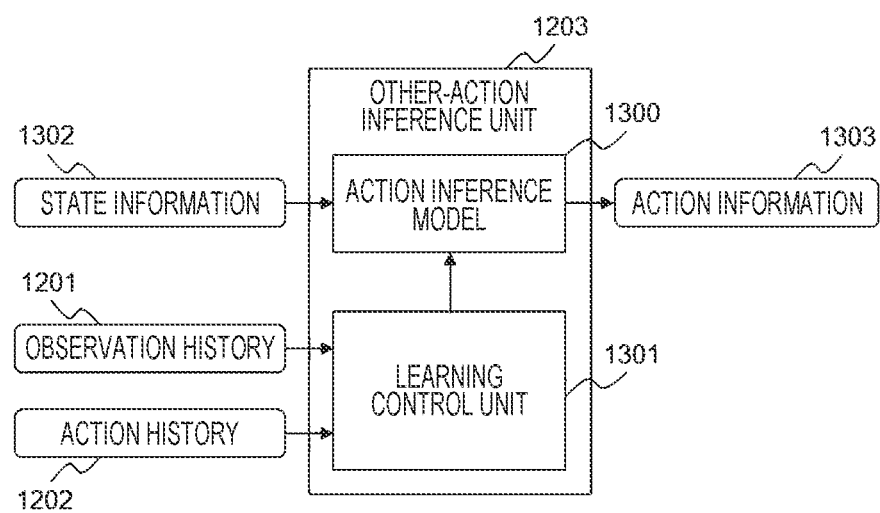
FIG. 13 is a diagram illustrating an example of a configuration of an other-action inference unit.

FIG. 13 is a diagram illustrating an example of a configuration of the other-action inference unit 1203. The other-action inference unit 1203 includes an action inference model 1300 and a learning control unit 1301. The action inference model 1300 is an inference model by using, as an input, the state information 1302 as an input and outputting action information 1303. The state information 1302 has the same format as the self-state information 501 and the other-state information 503 generated by the model input information generation unit 220 in order to be input to the future state prediction unit 230 when determining the action of the autonomous robot 300. The action inference model 1300 is a model learned by supervised learning with the state history 1201 as an input and the action history 1202 as an output. That is, the action inference model 1300 learns what action the autonomous robot 300 has taken in a certain state. The learning control unit 1301 controls learning of the action inference model 1300 such as performing of learning and update of the model.

In the third embodiment, when the future state prediction unit 230 generates the other-self-prediction information 803, the action information 1303 inferred by the other-action inference unit 1203 is input instead of the action candidate information 502 that is the action candidate of the other. The other-action inference unit 1203 inputs the self-state information 501 and the other-state information 503 of the other, as the state information 1302, and outputs inference information of the other action. The action inference model 1300 is a model for inferring what action the own robot being the autonomous robot 300 takes in a certain state. Therefore, in the other action inference in the third embodiment, an action inferred to be an action taken by the autonomous robot 300 in a case where the autonomous robot 300 is placed in a situation of the other is set to the inference of an action of the other.

In the third embodiment, the action of the autonomous robot 300 is determined by the same method as in the first embodiment except that the future state prediction unit 230 uses the other action inferred by the other-action inference unit 1203 when predicting the other-self-prediction information 803. In the third embodiment, since the prediction accuracy of the other-self-prediction information 803 is improved, it is easy to avoid the collision between the autonomous robot and the other.

Fourth Embodiment

In a fourth embodiment, an example in which the other observation information generation unit 210 generates the other observation information based on more information than in the first embodiment will be described. The fourth embodiment will be described focusing on the difference from the first embodiment, and the description of the same configuration as the first embodiment will be omitted.

In the first embodiment, the example in which the observation information is the position information of the own robot or person and the surrounding other indicated in the observed position information 410 illustrated in FIG. 4C has been described. In the case of the observed position information 410, observation information of the surrounding other can be generated by moving coordinate information that is the position information. The fourth embodiment shows an example in which image information 401 and 402 (FIG. 4A and FIG. 4B) by a camera is used as the observation information. In a case where the image information is used as the observation information, a configuration in which the image information 401 and 402 is input as the other-state information 503 input to the future state prediction unit 230, and the other-prediction information 802 also outputs an image acquired by the camera at the next time is made. In general, since the image information has a higher dimension than the position information of an object, it is difficult to learn the prediction model 500. On the other hand, when the image information is directly handled, the information discarded when the image information is converted into the object information can be utilized without discarding the information. Therefore, it is possible to expect the possibility of generating the prediction information leading to better action generation as the expression of the input information is enriched.

Figure 14:
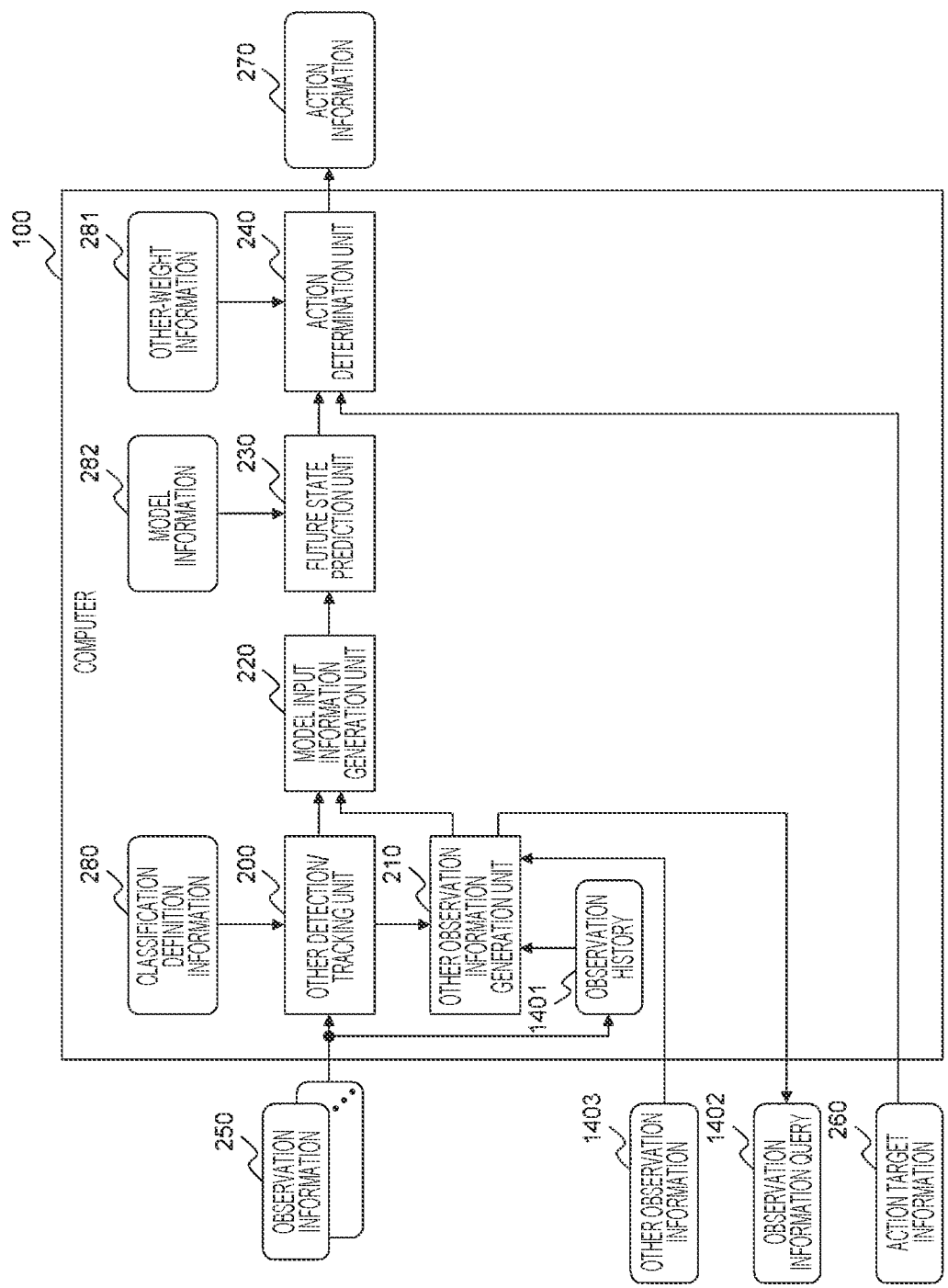
FIG. 14 is a diagram illustrating an example of a functional configuration of a computer in a fourth embodiment.

FIG. 14 is a diagram illustrating an example of a functional configuration of a computer 100 in the fourth embodiment.

The fourth embodiment is different from the first embodiment in that an observation history 1401 that stores a history of the observation information, an observation information query 1402 that requests the other to transmit the observation information, and other observation information 1403 transmitted from the other are input.

In a case where the observation information is set to the image information, it is necessary to generate an image observed by the other around the autonomous robot 300 as the observation information of the other. That is, when the position information and the observation image of the autonomous robot 300 are given, it is necessary to infer the observation image in a case of being viewed from the viewpoint of a specific other around the autonomous robot 300. Such an inference technique is known as a task (Novel View Synthesis) of synthesizing images from different viewpoints from a plurality of acquired images and viewpoint information thereof, and there are many known techniques. For example, it is possible to use a technique of outputting an observation image from another viewpoint in a manner that a plurality of images, viewpoint information of the images, and another viewpoint information from which an image is to be estimated are input by using a neural network learned by images of a plurality of viewpoints and viewpoint information of the images, which is the technique disclosed in NPL 2.

In the fourth embodiment, by implementing a method of inferring an observation image from another viewpoint such as the method disclosed in NPL 2 in the other observation information generation unit 210, it is possible to generate the other observation information 1403 by using an image as the observation information. Since the autonomous robot 300 generates the image of the other, even in a case where it is not possible for the other to directly acquire the observation information by communication like a person or the like instead of the robot, it is possible to generate the action of the autonomous robot 300 by the same method as in the first embodiment.

At this time, the observation images of a plurality of viewpoints, the viewpoint information of the observation images, and the viewpoint information of the other are required as inputs. Regarding the observation images of the plurality of viewpoints and the viewpoint information of the observation images, a configuration in which the autonomous robot 300 stores image information observed over a plurality of times and the viewpoint information thereof as the observation history 1401 is an example. In addition, as in the case of acquiring observation images from a plurality of front and rear viewpoints illustrated in FIGS. 4A and 4B, if a configuration in which the autonomous robot 300 sequentially acquires observation images from a plurality of viewpoints is used, a configuration using a plurality of observation images acquired from the plurality of viewpoints and viewpoint information thereof is also an example. A configuration in which the viewpoint information of the other is acquired by the observed position information 410 is an example.

Furthermore, in a case where the other around the autonomous robot 300 is not a person but another autonomous robot that shares a system with the autonomous robot 300 or a device that sequentially acquires observation images such as a monitoring camera, a configuration in which a transmission request query (observation information query 1402) for images observed by the other is transmitted to the other to acquire observation images (other observation information 1403) of the other, and the acquired other observation images are set as observation images from a plurality of viewpoints is also an example.

The other observation information generation unit 210 has a function of controlling transmission and reception of observation images to and from surrounding others. Furthermore, in a case where the other being a generation target of an observation image is a device capable of communicating the observation image, a configuration in which other observation image is generated by acquiring an observation image of the other with communication by similar means can also be made.

According to the above method, in the fourth embodiment, in a case where the prediction model 500 handles image information, it is possible to generate the other-state information 503 that is the input of the prediction model 500. In the fourth embodiment, the action of the autonomous robot 300 is determined by the same method as in the first embodiment except that the other state information is used as the image information.

The present invention is not limited to the above-described embodiments, and includes various modifications and equivalent configurations within the spirit of the appended claims. For example, the above embodiments are described in detail in order to explain the present invention in an easy-to-understand manner, and the present invention is not necessarily limited to a case including all the described configurations. In addition, a portion of the configuration of one embodiment may be replaced with the configuration of another embodiment. Further, the configuration of one embodiment may be added to the configuration of another embodiment. Regarding some components in the embodiments, other components may be added, deleted, and replaced.

In addition, some or all of the above-described configurations, functions, processing units, processing means, and the like may be realized by hardware by, for example, designing with an integrated circuit, or may be realized by software by a processor interpreting and executing a program for realizing each function.

Information such as a program, a table, and a file, that realizes each function can be stored in a memory, a storage device such as a hard disk and a solid state drive (SSD), or a recording medium such as an IC card, an SD card, and a DVD.

Control lines and information lines considered necessary for the descriptions are illustrated, and not all the control lines and the information lines in mounting are necessarily shown. In practice, it may be considered that almost all components are connected to each other.

The invention claimed is:

1. A robot system, comprising:
a computer; and
a robot that is controlled by the computer,
wherein the robot includes:
a control device that is connected to the computer and controls an action of the robot, and
an observation device that is connected to the computer and observes a periphery of the robot,
wherein the computer includes:
a processor, a storage device that is connected to the processor, and an interface that is connected to the processor,
wherein the processor is configured to:
detect a plurality of objects in a periphery by using observation information obtained by observation of the observation device and store first state information of each of the plurality of detected objects, predict future states of the plurality of detected objects from the first state information by using a first model for predicting a future state of an object, generate second state information of the periphery observed by the plurality of detected objects, predict a future state of the robot from the second state information by using the first model, determine a future action of the robot based on a given action target, the predicted future states of the plurality of objects, and the predicted future state of the robot, and control at least one of the steering angle and an acceleration of the robot based on the determined future action of the robot.

2. The robot system according to claim 1, wherein the computer is configured to:

calculate a weight for each detected object based on at least one of a type and a feature of the detected object, and determine the action by using the calculated weight.

3. The robot system according to claim 2, wherein the computer is configured to determine an action with a small weighted sum of an action target difference, an other expectation difference, and an other uncertainty, the action target difference representing a difference between the given action target and an actual action, the other expectation difference representing a difference between a predicted future state of the robot by the own robot and a predicted future state of the robot by the plurality of detected objects, and the other uncertainty representing entropy of the predicted future states of the plurality of detected objects.

4. The robot system according to claim 1, wherein the computer is configured to:

determine a type of an object in accordance with classification definition information for specifying the type of the object, and generate the second state information in accordance with the type of the object.

5. The robot system according to claim 1, wherein the computer is configured to:

compare pieces of future prediction information of the plurality of objects and state information of the periphery generated from the observation information at a next time, compute a prediction error of the plurality of objects, and determine the action by using a computed weight of each object based on the computed prediction error.

6. The robot system according to claim 1, wherein the computer is configured to:

include a second model using, as an input, state information of the periphery generated from the observation information, and outputting action information representing a control result of the action, predict pieces of action information of the plurality of objects from the state information of the periphery obtained by observation of the plurality of detected objects, by using the second model, and predict the future states of the plurality of objects by using the pieces of predicted action information of the plurality of objects.

7. The robot system according to claim 1, wherein the computer is configured to:

generate an observation image from the plurality of objects by using an observation image acquired by the observation device, and predict future state information of the robot by using the first model and using the observation image from the plurality of objects as the second state information.

8. The robot system according to claim 7, wherein the computer is configured to:

include a third model for generating an observation image at another viewpoint from the observation image and viewpoint information on a viewpoint where the observation image is acquired, learn the third model by using observation images obtained by observation at a plurality of points, and generate an observation image of the plurality of objects from the observation image and the viewpoint information on the viewpoint where the observation image is acquired by using the learned third model.

9. The robot system according to claim 1, wherein the computer is built in or provided separately from the robot.

10. A control device of a robot, comprising:

a computer including a processor;

a storage device connected to the processor; and an interface connected to the processor, wherein the robot includes the control device that is connected to the interface and controls an action of the robot, and the robot includes an observation device that is connected to the interface and observes a periphery of the robot, wherein the control device is configured to:

detect a plurality of objects in a periphery by using data acquired by the observation device, store first state information of each of the plurality of detected objects, predict future states of the plurality of detected objects from the first state information by using a first model for predicting a future state of an object, generate second state information of the periphery observed by the plurality of detected objects, predict a future state of the robot from the second state information by using the first model, determine a future action of the robot based on a given action target, the predicted future states of the plurality of objects, and the predicted future state of the robot, and control at least one of the steering angle and an acceleration of the robot based on the determined future action of the robot.

11. A control method of a robot that is executed by a computer, the computer including an arithmetic operation device that executes a program, a storage device connected to the arithmetic operation device, and an interface connected to the arithmetic operation device, the robot including a control device connected to the interface and an observation device connected to the interface, and the control method comprising:

detecting a plurality of objects in a periphery by using data acquired by the observation device and storing first state information of each of the plurality of detected objects in the storage device, by the arithmetic operation device;

predicting future states of the plurality of detected objects from the first state information by using a first model for predicting a future state of an object, by the arithmetic operation device;

generating second state information of the periphery observed by the plurality of detected objects, by the arithmetic operation device;

predicting a future state of the robot from the second state information by using the first model, by the arithmetic operation device;

determining a future action of the robot based on a given action target, the predicted future states of the plurality of objects, and the predicted future state of the robot, by the arithmetic operation device; and controlling at least one of the steering angle and an acceleration of the robot based on the determined future action of the robot.

\* \* \* \* \*